(12) United States Patent
Bender et al.

(10) Patent No.: US 12,173,927 B2
(45) Date of Patent: Dec. 24, 2024

(54) AIR IONIZATION SYSTEM AND METHOD

(71) Applicant: IONaer International Arizona, LLC, Scottsdale, AZ (US)

(72) Inventors: Timothy Mark Bender, Scottsdale, AZ (US); Perry Pauley, Glendale, AZ (US); Brian Keith Roper, Phoenix, AZ (US); Todd K. Roper, Glendale, AZ (US)

(73) Assignee: IONaer International Arizona, LLC, Scottsdale, AZ (US)

( * ) Notice: Subject to any disclaimer, the term of this patent is extended or adjusted under 35 U.S.C. 154(b) by 707 days.

(21) Appl. No.: 17/315,233

(22) Filed: May 7, 2021

(65) Prior Publication Data

US 2021/0332996 A1 Oct. 28, 2021

Related U.S. Application Data

(63) Continuation-in-part of application No. 16/446,555, filed on Jun. 19, 2019, now Pat. No. 11,007,478.

(Continued)

(51) Int. Cl.
| | |
|---|---|
| *F24F 8/98* | (2021.01) |
| *F24F 8/108* | (2021.01) |
| *F24F 8/167* | (2021.01) |
| *F24F 8/30* | (2021.01) |
| *F24F 11/77* | (2018.01) |
| *F24F 110/10* | (2018.01) |
| *F24F 110/20* | (2018.01) |

(Continued)

(52) U.S. Cl.
CPC .............. *F24F 8/30* (2021.01); *F24F 8/108* (2021.01); *F24F 8/167* (2021.01); *F24F 8/98* (2021.01); *F24F 11/77* (2018.01); *F24F 2110/10* (2018.01); *F24F 2110/20* (2018.01); *F24F 2110/72* (2018.01); *F24F 2110/74* (2018.01)

(58) Field of Classification Search
CPC ..................................... F24F 8/30; F24F 8/98
See application file for complete search history.

(56) References Cited

U.S. PATENT DOCUMENTS

| | | | |
|---|---|---|---|
| 6,791,815 B1 | 9/2004 | Graham | |
| 8,048,370 B1 | 11/2011 | Barnes | |

(Continued)

FOREIGN PATENT DOCUMENTS

| | | |
|---|---|---|
| CN | 104907173 B | 9/2015 |
| CN | 107062483 A | 8/2017 |

(Continued)

*Primary Examiner* — Kevin Joyner
(74) *Attorney, Agent, or Firm* — SNELL & WILMER L.L.P.

(57) ABSTRACT

An air ionization unit is provided to ionize air to remove particulates and to release cleaned air. Air moves into the air ionization unit where it may be first filtered by an air intake filter. The air is moved, preferably by a fan, into contact with an ion generator, where the air is ionized. One or more (such as two) other fans may be used to provide airflow to (1) at least partially remove ions emanating from the air that has been exposed to the ion generator, and (2) to push the cleaned air through one or more ozone filters and out of the air ionization unit. The air ionization unit may also include an outgoing air filter, and one or more doors to access the air intake filter and/or the air ionization unit.

24 Claims, 16 Drawing Sheets

Related U.S. Application Data

(60) Provisional application No. 63/138,290, filed on Jan. 15, 2021, provisional application No. 63/021,197, filed on May 7, 2020.

(51) Int. Cl.
*F24F 110/72* (2018.01)
*F24F 110/74* (2018.01)

(56) References Cited

U.S. PATENT DOCUMENTS

| | | |
|---|---|---|
| 8,747,754 B2 | 6/2014 | Abate |
| 9,907,874 B2 | 3/2018 | Bender et al. |
| 9,908,081 B2 | 3/2018 | Bender et al. |
| 9,908,082 B2 | 3/2018 | Bender et al. |
| 10,350,541 B2 | 7/2019 | Bender et al. |
| 10,357,586 B2 | 7/2019 | Bender et al. |
| 10,363,332 B2 | 7/2019 | Bender et al. |
| 10,363,522 B2 | 7/2019 | Bender et al. |
| 10,406,476 B2 | 9/2019 | Bender et al. |
| 11,007,478 B2 | 5/2021 | Bender et al. |
| 11,331,622 B2 | 5/2022 | Bender et al. |
| 11,577,195 B2 | 2/2023 | Bender et al. |
| 2001/0031234 A1 | 10/2001 | Christodoulatos et al. |
| 2003/0106788 A1 | 6/2003 | Babko-Malyi |
| 2004/0007000 A1 | 1/2004 | Takeda et al. |
| 2004/0247497 A1 | 12/2004 | Yuen |
| 2007/0253860 A1 | 11/2007 | Schroder |
| 2008/0035472 A1 | 2/2008 | Lepage |
| 2008/0063577 A1 | 3/2008 | Crowe |
| 2008/0098899 A1* | 5/2008 | Uchida ............... F24F 8/125 96/255 |
| 2008/0317802 A1 | 12/2008 | Lee et al. |
| 2009/0202397 A1 | 8/2009 | Parker et al. |
| 2010/0089240 A1 | 4/2010 | Krichtafovitch |
| 2014/0198426 A1 | 7/2014 | Abate |
| 2015/0017059 A1 | 1/2015 | Arlemark |
| 2015/0076082 A1 | 3/2015 | Loucaides |
| 2016/0067645 A1 | 3/2016 | Mutha et al. |
| 2016/0263263 A1 | 9/2016 | Robert |
| 2017/0189846 A1 | 7/2017 | Cho et al. |
| 2017/0321877 A1 | 11/2017 | Bender et al. |
| 2017/0333587 A1 | 11/2017 | Bender et al. |
| 2017/0333837 A1 | 11/2017 | Bender et al. |
| 2017/0333838 A1 | 11/2017 | Bender et al. |
| 2017/0348636 A1 | 12/2017 | Bender et al. |
| 2018/0021789 A1* | 1/2018 | Carroll ............... F24F 13/28 95/69 |
| 2018/0036677 A1 | 2/2018 | Bender et al. |
| 2018/0193508 A1 | 7/2018 | Bender et al. |
| 2018/0193509 A1 | 7/2018 | Bender et al. |
| 2018/0193794 A1 | 7/2018 | Bender et al. |
| 2019/0374669 A1 | 12/2019 | Bender et al. |
| 2020/0009502 A1 | 1/2020 | Bender et al. |
| 2020/0009503 A1 | 1/2020 | Bender et al. |
| 2022/0339312 A1 | 10/2022 | Cecchi et al. |
| 2022/0404056 A1 | 12/2022 | Bloemer et al. |
| 2023/0042065 A1 | 2/2023 | Douglas et al. |
| 2023/0165996 A1 | 6/2023 | Edwards |

FOREIGN PATENT DOCUMENTS

| | | |
|---|---|---|
| CN | 206583003 U | 10/2017 |
| CN | 113685986 A | 11/2021 |
| JP | S59193158 A | 11/1984 |
| KR | 101461849 B1 | 11/2014 |
| KR | 20160014336 A | 2/2016 |
| KR | 20180007206 A | 1/2018 |
| KR | 102238936 B1 | 4/2021 |
| WO | 2016183237 A1 | 11/2016 |
| WO | 2019147501 A1 | 8/2019 |

* cited by examiner

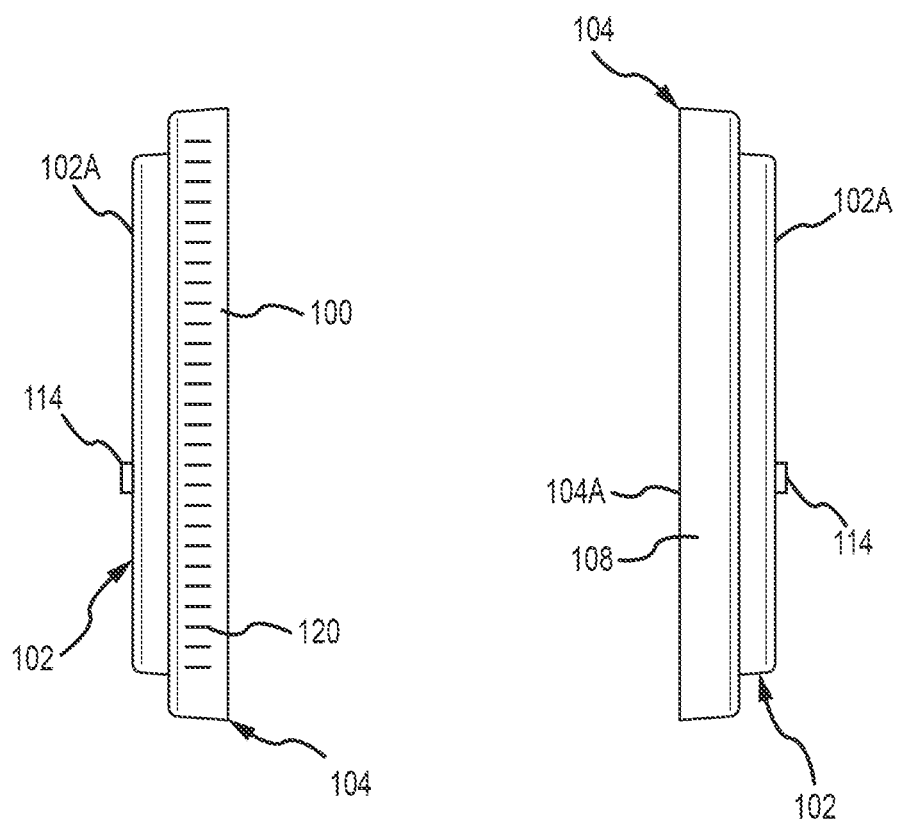

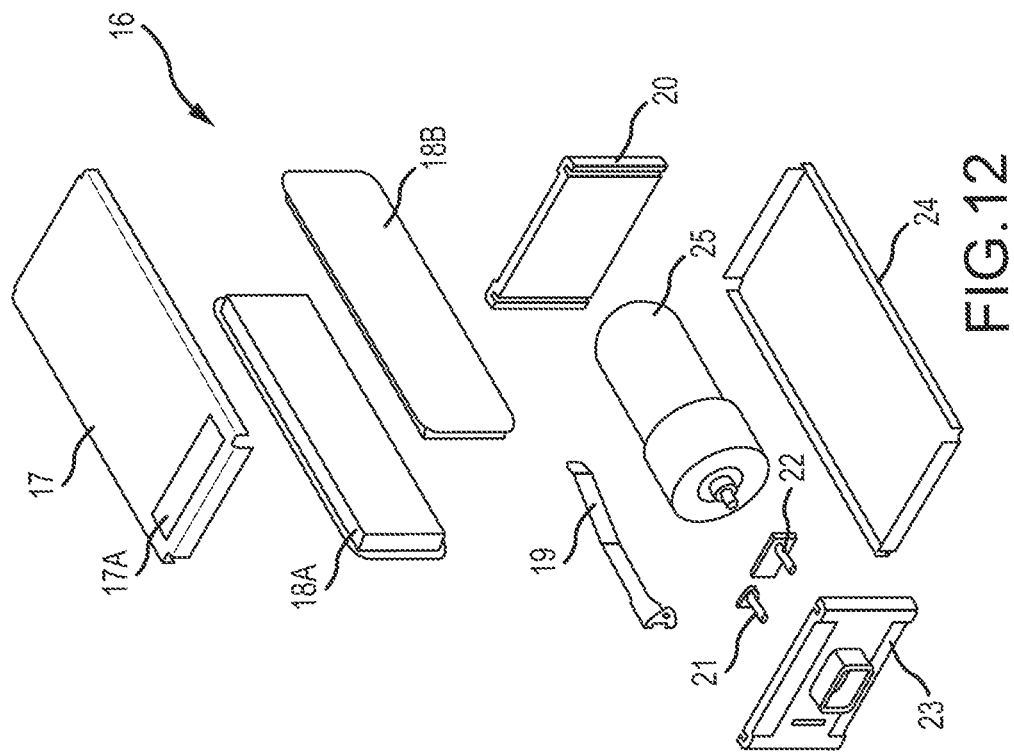
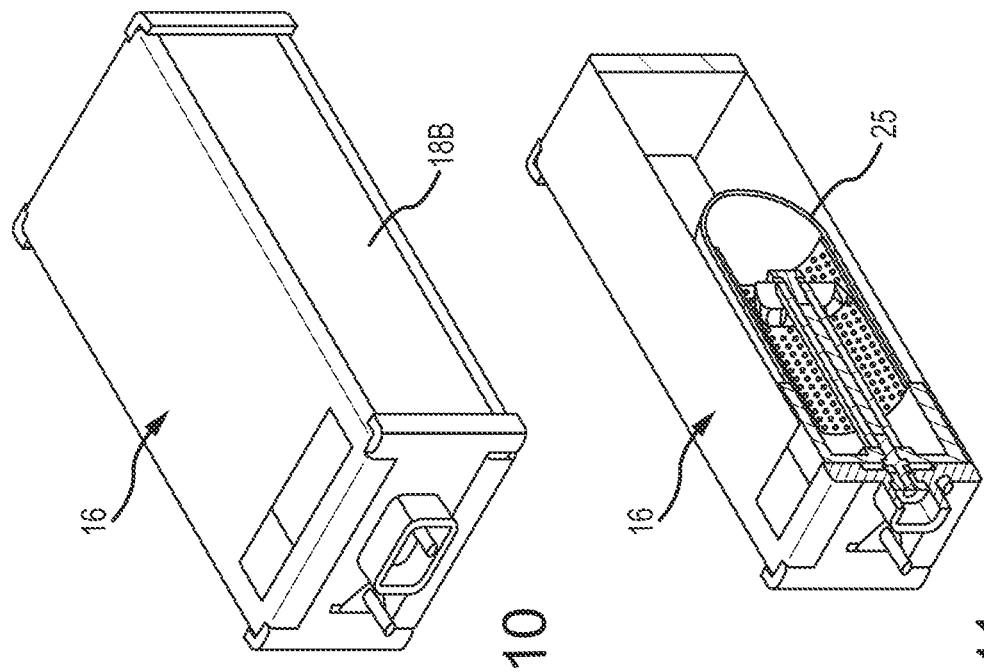
FIG. 10  FIG. 11  FIG. 12

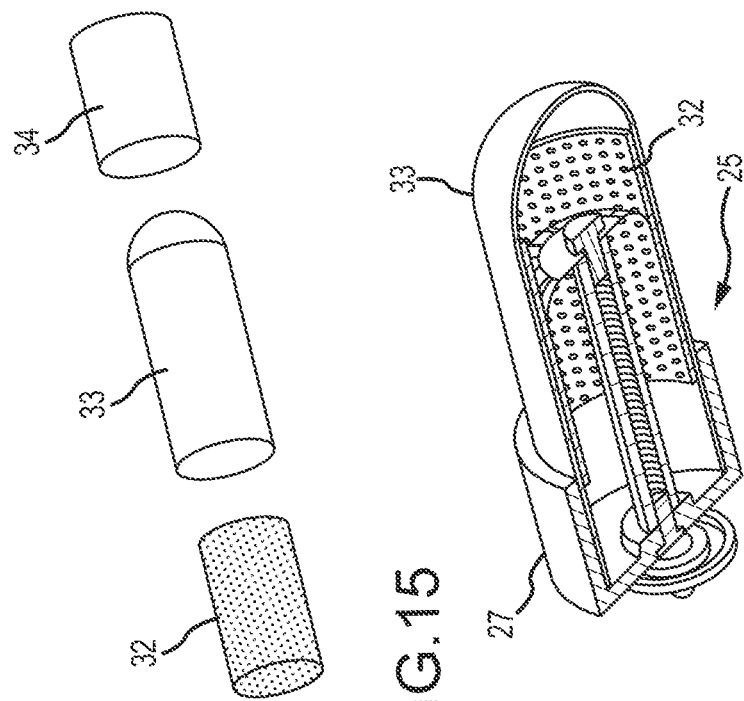
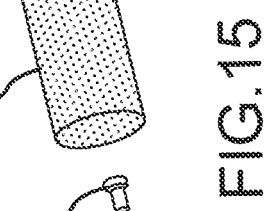
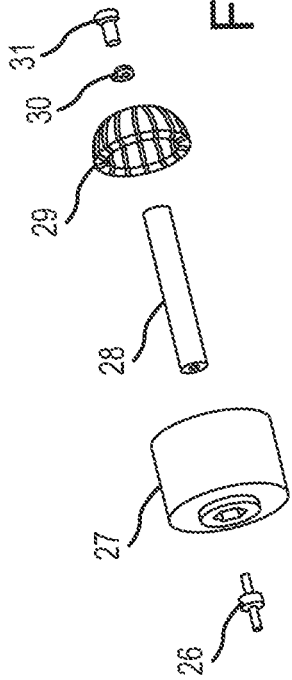

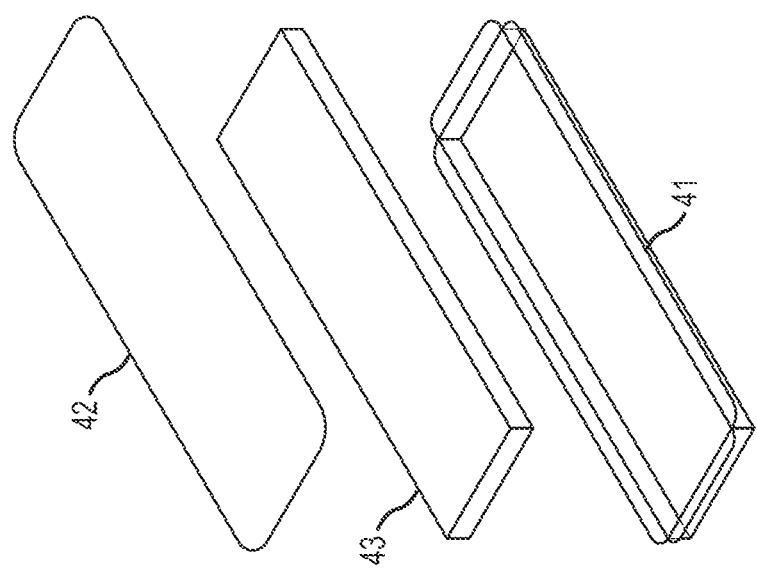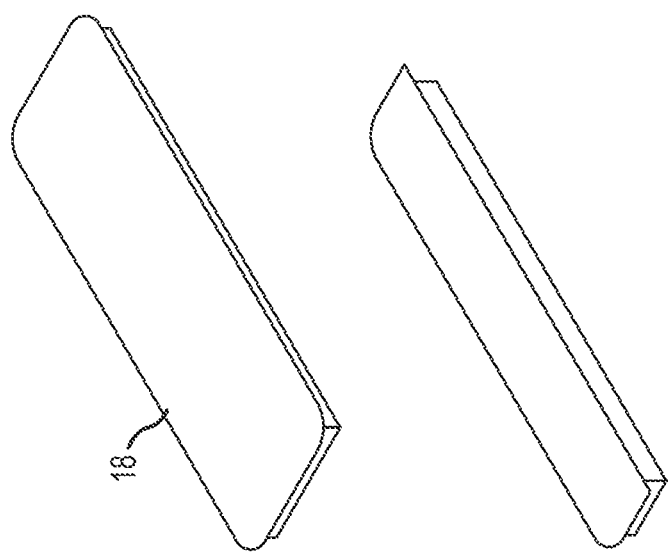
FIG. 18

AIR IONIZATION SYSTEM AND METHOD

CROSS-REFERENCE TO RELATED APPLICATIONS

This application claims priority to U.S. Provisional Application No. 63/021,197, filed on May 7, 2020, entitled "VIRUS DAMPENING AIR PURIFICATION SYSTEM AND METHOD," U.S. Provisional Application No. 63/138,290, filed on Jan. 15, 2021, entitled "AIR IONIZATION SYSTEM," and claims priority to and is a continuation-in-part of U.S. patent application Ser. No. 16/446,555, filed on Jun. 19, 2019, entitled "AIR IONIZATION SYSTEM AND DEVICE. The contents of each of the afore-mentioned applications are incorporated herein by reference.

BACKGROUND

Prior approaches to air filtration and/or ionization suffer from one or more drawbacks. For example, certain air ionization systems, in order to avoid releasing an unacceptable level of ozone, generate ionization levels that are insufficient to fully clean and/or sanitize a particular air stream. Moreover, some air ionization systems suffer from a lack of configurability and/or intelligent control. The disclosures of the following references are incorporated herein by reference: U.S. patent application Ser. No. 15/913,733, filed on Mar. 6, 2018 and entitled AIR IONIZATION SYSTEMS AND METHODS, U.S. patent application Ser. No. 15/914,682, filed on Mar. 7, 2018, entitled "AIR IONIZATION SYSTEM," U.S. patent application Ser. No. 15/622,025, filed on Jun. 13, 2017, entitled "AIR IONIZATION SYSTEMS AND COMPONENTS," U.S. patent application Ser. No. 15/622,027, filed on Jun. 13, 2017, entitled "AIR IONIZATION SYSTEMS AND COMPONENTS," U.S. Pat. No. 9,907,874, issued Mar. 6, 2018, entitled "AIR IONIZATION SYSTEMS AND METHODS," U.S. Pat. No. 9,908,081, issued Mar. 6, 2018, entitled "AIR IONIZATION METHODS," and U.S. Pat. No. 9,908,082, issued Mar. 6, 2018, entitled "AIR IONIZATION SYSTEM."

SUMMARY

This disclosure relates to cleaning air in a space that can be occupied, such as being occupied at times by people or animals. In one embodiment, an air ionization unit (or "ionization unit") is provided to ionize air to remove particulates and clean the air, and to release cleaned air into the occupied space. Air moves into the air ionization unit where it is preferably first filtered by an appropriate intake air filter, such as a pleated filter.

The air is moved, preferably by one or more fans and in one embodiment by a first fan assembly into an air ionization module, where the air moves into contact with an ion generator that ionizes the air. Preferably, one or more (and most preferably two) other fans are optionally used to provide airflow to remove ions emanating from the air that has been exposed to the ion generator and to push the cleaned air through one or more ozone filters and back into the occupied space. This airflow back into the occupied space may move through vertical slots or louvers in the ionization unit, which may also include an outgoing air filter.

The ionization unit is preferably 12 VDC or 24 VDC powered, conveniently mounts to a ceiling or other structure, and has access doors for air filter replacement and/or for ionization module replacement. Exemplary dimensions of the ionization unit are 300 mm width×500 mm depth×65 mm height.

The system and method may also include a controller (or "control system") and sensors on the ionization unit or remote sensors that do, as examples, one or more of the following: (1) measure the amount of particulate in the air, (2) measure the amount of negative and/or positive ions in the air, (3) measure the amount of ozone in the air, (4) measure the amount of carbon monoxide in the air, (5) measure the air temperature and humidity. The controller may adjust the amount of ions being released, and the amount of positive and negative ions being released, and/or the operation of one or more fans, based on one or more of the preceding measured parameters. The controller and/or sensors may be included inside of, or be remote to, the air ionization unit.

The air ionization unit may be used in applications such as: (1) aircraft (e.g., cabin area, pilot area, cargo area), (2) ground transportation (e.g., city buses, school buses, coaches, taxis), (3) trains (e.g., commuter, inter-city, rapid transit, tram, light rail, maglev), (4) ships (e.g., cargo and freighters, ferries, cruise ships, passenger ships, ocean liners), or (5) buildings, in which case it could interface with Building Management Systems (BMS).

BRIEF DESCRIPTION OF THE DRAWINGS

FIG. 2C is a side view of the ionization unit of FIG. 2.

FIG. 2D is an alternate side view of the ionization unit of FIG. 2.

FIG. 10 is an assembled, side, perspective side view of an air ionization module.

FIG. 11 is a cross-sectional, side, perspective view of the ionization module of FIG. 10.

FIG. 12 is an exploded, side, perspective view of the ionization module of FIG. 11.

FIG. 13 is a side, perspective view of an ion generator.

FIG. 14 is a cross-sectional, side, perspective view of the ion generator of FIG. 13.

FIG. 15 is an exploded view of the ion generator of FIG. 13.

FIG. 18 shows side, perspective views of ozone filters.

DETAILED DESCRIPTION

Figure 1:
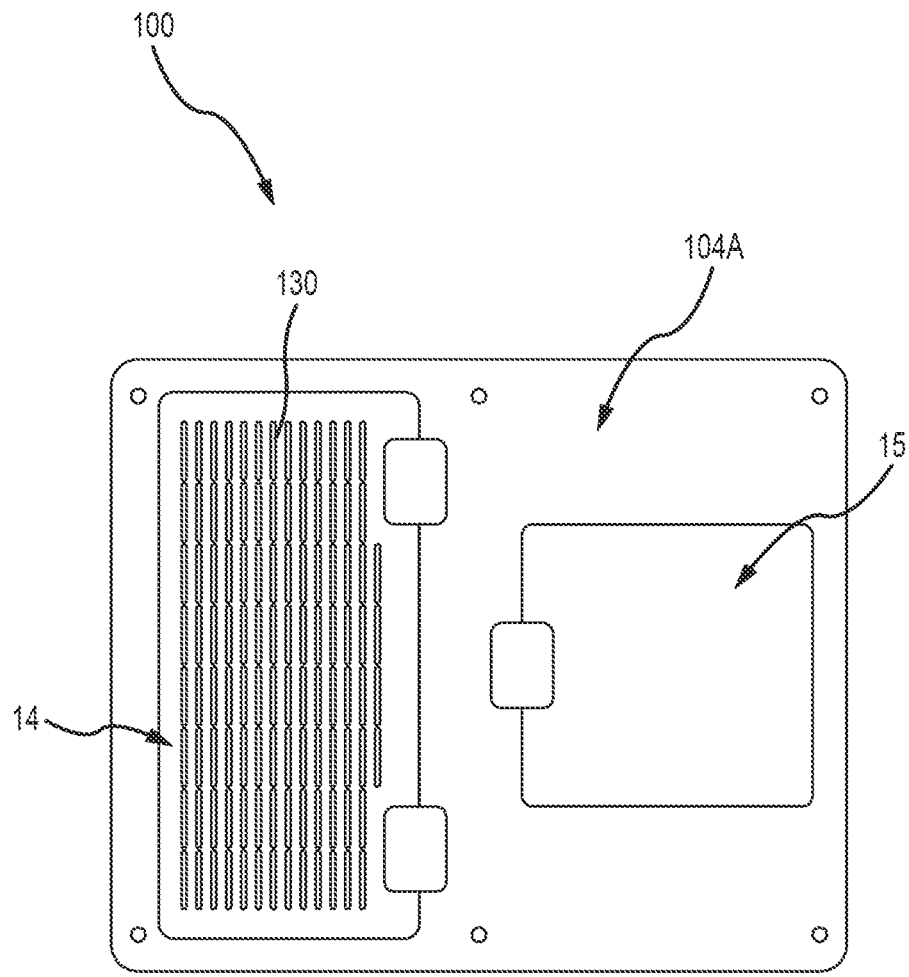
FIG. 1 is an assembled, bottom view of an air ionization device in accordance with aspects of this disclosure.
Figure 2:
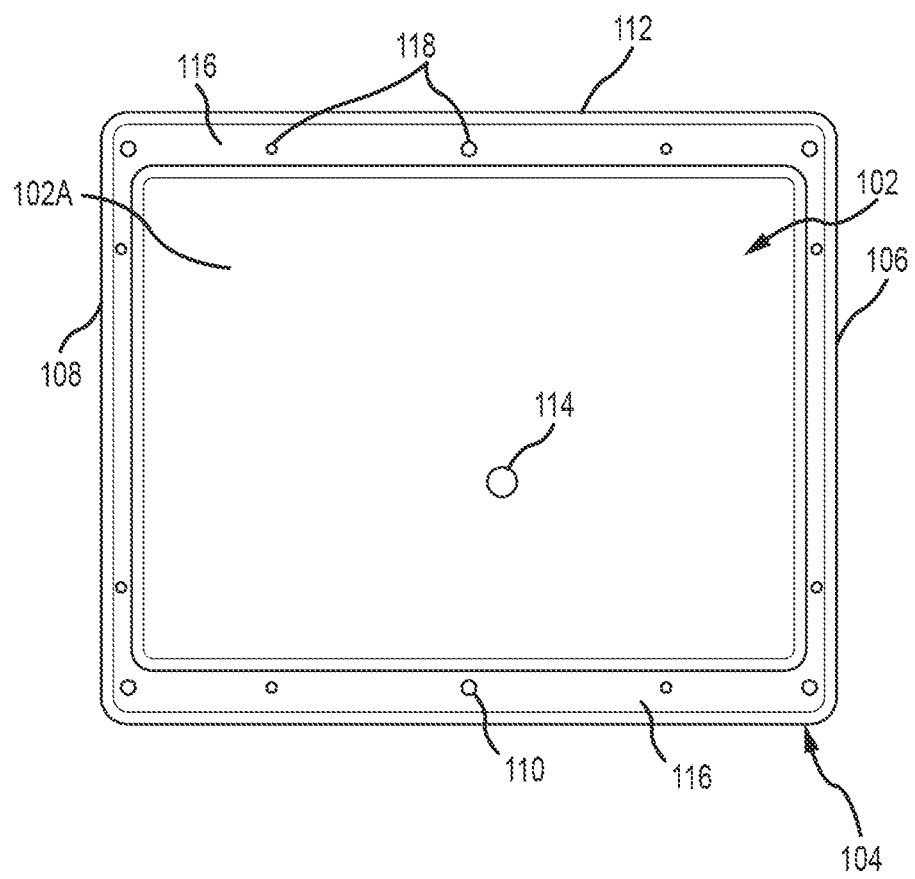
FIG. 2 is a top view of the ionization unit of FIG. 1.
Figure 2A:
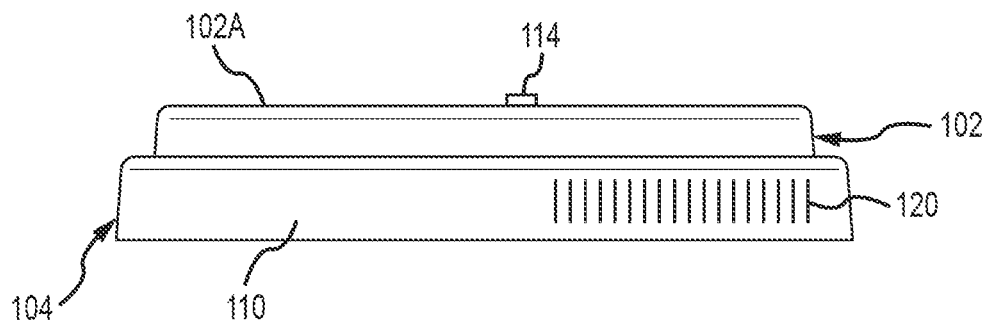
FIG. 2A is a front view of the ionization unit of FIG. 2.
Figure 2B:
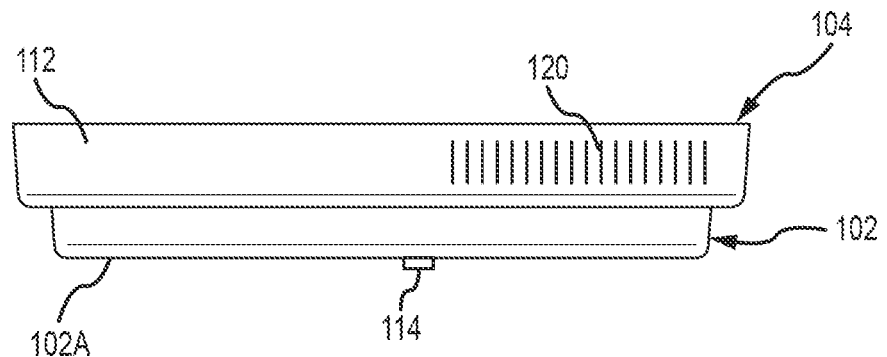
FIG. 2B is a back view of the ionization unit of FIG. 2.
Figure 3:
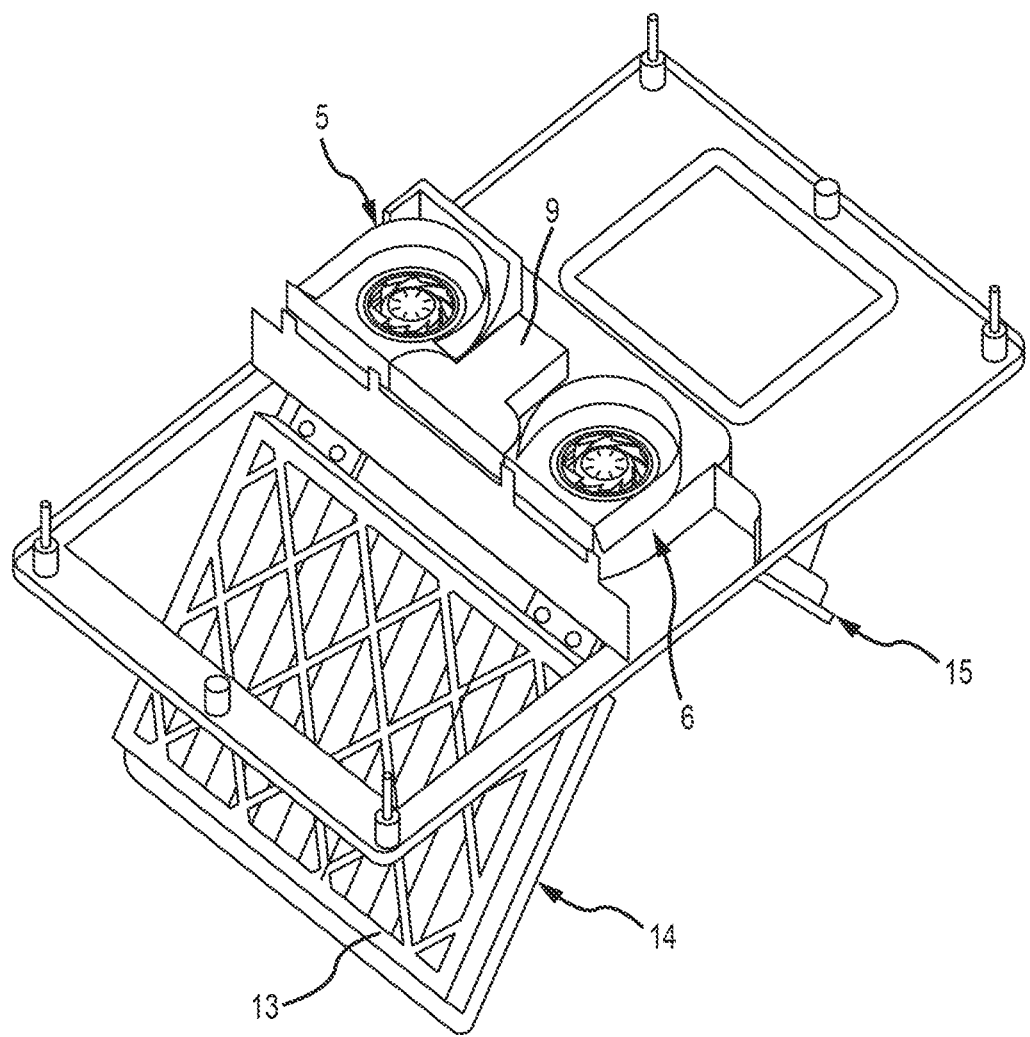
FIG. 3 is an open, top view of the air ionization unit of FIG. 1 with the top cover removed.
Figure 4:
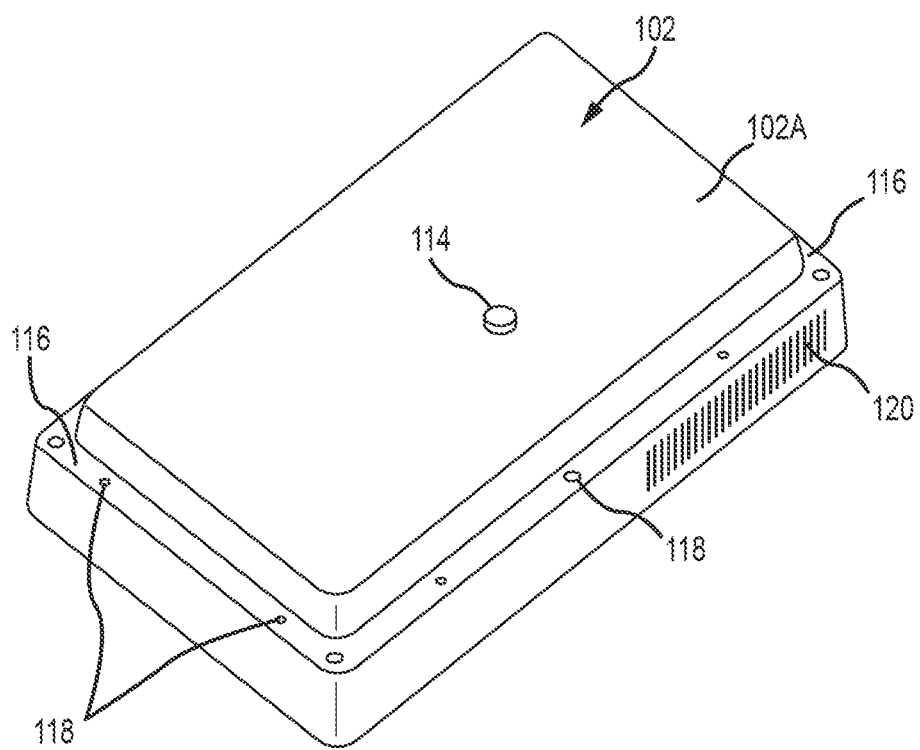
FIG. 4 is a top, perspective view of the air ionization unit of FIG. 1.

Turning now to the Figures, in which the purpose is to describe embodiments of this disclosure and not to limit the scope of the claims, an air ionization unit 100 is shown.

FIGS. 1-9 shows an air ionization unit 100. Unit 100 has a top section (also called the top cover) 102 with a top surface 102A, a bottom (or lower) section 104 with a bottom (or lower) surface 104A, a front side 106, a rear side 108, a first side 110, and a second side 112.

Top section (or top cover) 102 in this embodiment is connected to bottom section 104 in any suitable manner, such as by fasteners. Top surface 102A has a power inlet 114 of any suitable type for connecting to a power source, such as DC power from a vehicle. The top cover 102 is configured to allow for supply power cords for the ionization unit 100 to be safely and adequately positioned on the side of surface 1 opposite lower section 104.

Not shown in these drawings is a power supply cord that powers the ionization unit 100. The air ionization unit 100 would be configured to operate with any suitable power source, such as 12 VDC or 24 VDC supply power, but could also operate at other input voltages such as 24 VAC, 90 VAC, 120 VAC 240 VAC or other, and could be entirely or partially battery powered, such as being battery powered when other power is unavailable or insufficient. DC (direct current) may be supplied by one or more solar panels or another energy source.

Bottom section 104 has an outer flange 116 that includes mounting holes 118 for receiving fasteners 4 to mount ionization unit 100 to a surface such as surface 1, which could be the ceiling of a vehicle or other structure.

Lower surface 104A is preferably configured to be cosmetically appealing in the environment in which ionization unit 100 is mounted. Lower surface 104A may be made of plastic, stainless steel, steel, or other suitable material. It may be powder coated (steel or aluminum), anodized (aluminum), passivated (stainless steel), or plated (steel or plastic).

Lower surface 104A as shown preferably has two access doors 14 and 15, one of which is for accessing and replacing the intake air filter 13, and another of which is for accessing and replacing the air ionization module 16. Lower surface 104A may have one or more latch mechanisms for securing the access doors 14, 15 to a first, closed position, and/or it may have a locking mechanism for increased security. Exemplary latch mechanisms may be rotary, sliding bar, magnetic, or any other type deemed suitable for this application. The latch mechanisms may include sensors so that access to the air ionization unit 100 can be time and date stamped.

Alternatively, only one door may be used, in which case one or both of the intake air filter 13 and air ionization module 16 could both be accessed and replaced by opening the single door (i.e., moving the single door from a first, closed position to a second, open position). The door could be hinged or slide open, or open and close in any suitable fashion. The entire lower surface 104A may function as a single door, or only part of lower surface 104 may function as a single door.

Figure 6:
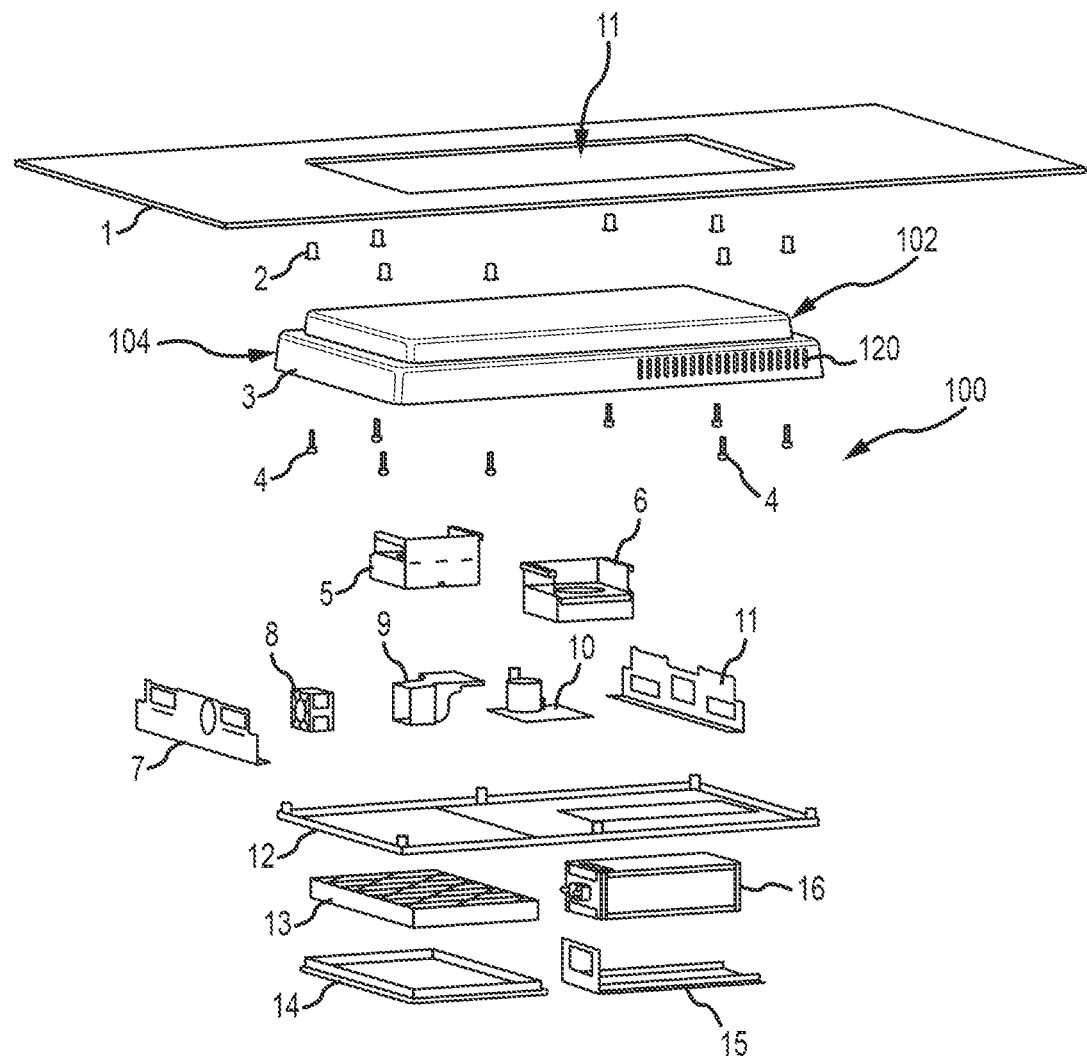
FIG. 6 is a partially exploded view of the air ionization unit of FIG. 1 and a surface with an opening to receive the air ionization unit.
Figure 7:
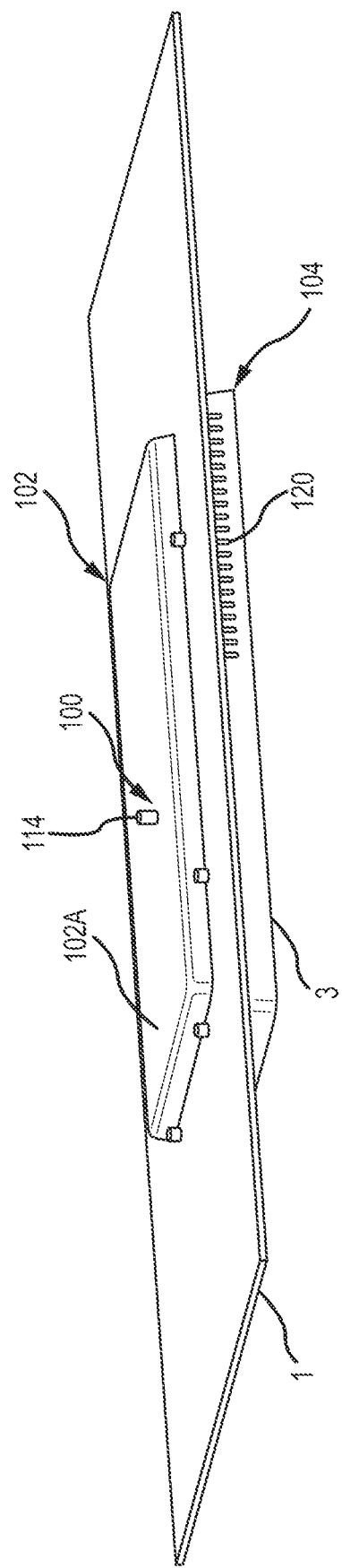
FIG. 7 is a side, perspective, assembled view of the air ionization module of FIG. 6 received on a surface.
Figure 8:
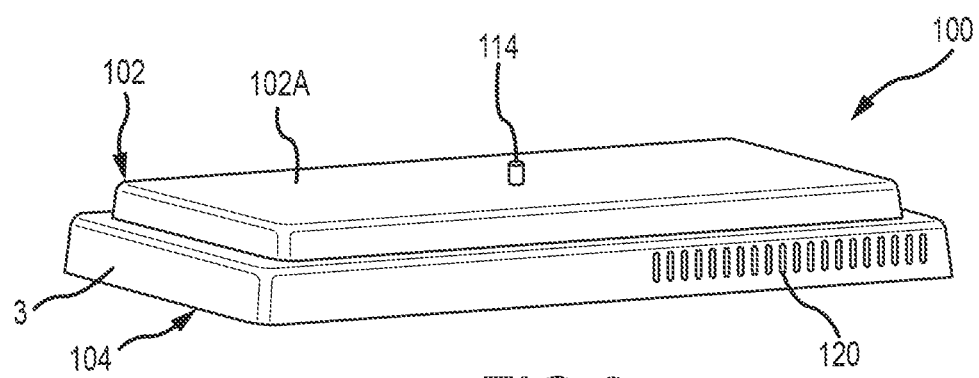
FIG. 8 is a side, perspective view of the air ionization unit of FIG. 1.

Fasteners 2, shown in FIG. 6, are not part of the air ionization unit, and are used to form openings in surface 1, wherein the openings would receive fasteners 4.

An air inlet (or intake) 130 as shown is formed in door 14 at lower surface 104A, but may be at any suitable location, and air enters air ionization unit 100 through inlet 130.

Surface 1, shown in FIG. 6, is a ceiling or other surface to which air ionization unit 100 can be attached. This ceiling, roof, or other surface may be the inside ceiling of a bus, shuttle bus, automobile, truck, tram, airplane fuselage, a drop ceiling in commercial or industrial building, or other. Surface 1 may be constructed of any suitable material. The cutout (or opening) 11 in surface 1 is configured so that the air ionization unit (or "ionization unit") 100 may fit into the opening and, in this embodiment, at least partially into a space above the surface 1.

Fastening hardware (or fasteners) 4 may be installed through openings 118 and into the surface 1 to secure the air ionization unit 100 onto the surface 1. Fasteners 4 could be rivet nuts, rivets, or any suitable hardware.

A first, left-side fan 5 is for moving air past an ozone filter and out of the ionization unit 100, preferably through louvers or vents 120. As shown, the louvers or vents 120 are in front 106, side 110, and side 112 although they can be at any suitable location. The first, left-side fan 5 (or first fan) preferably has a centrifugal (or "cyclone")-style fan unit to distribute air, although any device or suitable style of fan(s) for moving air out of ionization unit 100 would suffice. The first, left-side fan 5 is preferably configured to deliver high airflow and high static pressure (e.g., 25-560 Pa) at a low noise or dB level (e.g., 10-40 dB). The first, left-side fan may or may not be DC power only, or AC power only, and the cubic feet per minute ("CFM") of airflow generated by left-side fan assembly 5 is typically between 8.1 and 39.9 CFM, although lower or higher CFM values may also be used dependent upon the ionization unit 100 size, application, or environment.

Second, right-side fan (or second fan) 6 is for moving air past an ozone filter and out of the ionization unit 100, preferably through louvers or vents 120. Its structure, purpose, and function are preferably the same as that for first, left-side fan 5.

The fans 5 and 6 distribute cleaned air back into the occupied space outside of air ionization unit 100, in this embodiment by moving the air through the ozone filter(s) and through slots or louvers 120. Fans 5 and 6 are sometimes collectively referred to herein as the second fan assembly, and the second fan assembly may only include one fan, or more than two fans.

Top covers 36, 40, are, respectively, for fans 5 and 6. They are preferably made of plastic, although other suitable materials such as steel, stainless-steel, or aluminum may be used.

Left-side bulkhead (or incoming air bulkhead) 7 is preferably comprised of stainless steel, steel, aluminum, or any other suitable material. It is preferably a structural member of the ionization unit 100, although it need not be. Left-side bulkhead 7 may have a hinge on the lower side closest to the air intake filter 13. This hinge would allow the access door 14 to open to a second position and close to a first position, providing a convenient way to access and replace the intake air filter 13 when access door 14 is in its second, open position.

Box-style DC (or direct current) first fan 8 is mounted to the left side bulkhead 7. The first fan 8 may or may not be DC power only, or AC power only, and the CFM of airflow generated by fan 8 is typically between 5.3 and 20.8 CFM, although lower or higher CFM values may also be used dependent upon the ionization unit 100 size, application, or environment. Fan (or first fan) 8 moves air into the air ionization module 16 and in contact with ion generator 25 in order to be ionized, and can assist in moving ionized air through the ozone filter. Fan 8 is sometimes referred to as the first fan assembly and it may include more than one fan.

Centrifugal or "cyclone"-style fan unit 37 is for distribution of air, although any means of moving air into and out of ionization unit 100 would suffice. Fan unit 37 is preferably positioned in fan assemblies 5, 6, and 8. Fan 37 delivers sufficient airflow at a high static pressure (e.g., 25-560 Pa) and at a relatively low noise or dB level (e.g., 10-40 dB). The fan 37 may or may not run on DC power only, or AC power only, and the CFM (cubic feet per minute) of airflow generated by fan 37 is typically between 8.1 and 39.9 CFM, although lower or higher CFM values may also be used dependent upon the ionization unit's size, application, or environment. One or more other fans or styles of fan could also be used. Hardware 38 is for attaching the fans to lower fan boxes 35 and 39. Lower fan boxes 35 and 39 are made of plastic, although other suitable materials such as steel, stainless-steel, or aluminum may be used.

Plenum 9 transfers and directs the airflow of the first fan assembly 8 into the air ionization module 16 and into contact with ion generator 25. Plenum 9 is preferably made of plastic, although another suitable materials may be used.

Controller circuit board assembly 10 (also called a control or control system) can be used to control air ionization unit 100. Circuit board assembly 10 preferably includes a high voltage transformer. The transformer may be directly attached to the circuit board assembly 10, or it may be mounted separately, either inside or outside of ionization unit 100, and the transformer increases or decreases voltage that determines how many ions are generated by ion generator 25. The circuit board assembly 10 may also have circuitry or structure to control the ionization output level based upon any suitable parameter, such as the delivery rate of air into air ionization unit 100.

The circuit board assembly 10 may also include a radio or other device for RF communication. The type of radio is preferably Bluetooth, but can also be one or more of WiFi, ZigBee, DigiMesh, Lora, and/or other types. The radio preferably has multiple uses, such as control of the air ionization system 100, transmission of data packets and sensor information, service information for repair or replacement of modules, and/or other. The circuit board assembly 10 may also include a communication interface hardware and connectors so that control system protocols (e.g., CAN bus) may be hard-wired to the circuit board assembly 10 for air ionization unit 100 control. These connections could be made using standard insulated copper wire, but could also or instead use fiber optic materials, or other manner of transmitting data, including wireless transmission.

The circuit board assembly 10 may also include one or more devices for obtaining and/or securing video streams from a camera mounted in or to the air ionization unit 100, or from an external camera transferring data to the circuit board assembly 10, typically via a coaxial cable. In this manner, the circuit board assembly could be used to monitor security and activity in the occupied space.

The circuit board assembly 10 may include one or more sensors, and/or communicate with one or more remote sensors, to measure parameters of the air being cleaned such that these sensors can measure and store air quality indices within the occupied space. This data can be used to make local decisions (closed loop control) or can be transmitted from the vehicle or building in which ionization unit 100 is positioned for remote monitoring of air quality. As an example, each of a fleet of buses could be reporting air quality values to a centralized control location or monitoring facility. In this instance, sensor or performance data gathered from the ionization unit 100 would be sent via copper wire (hard-wired) or via wireless signal (e.g., RF signal) to a separate unit whose designated task is to receive the data from a host control system (e.g., a cellular network). The data can then be received, stored, and/or analyzed at the central control station. Commands may be sent from the central control station to the ionization unit 100 of each buss to increase or decrease the amount of ionization, the amount of negative ions versus positive ions generated, the speed of the first fan assembly and/or the second fan assembly.

Figure 21:
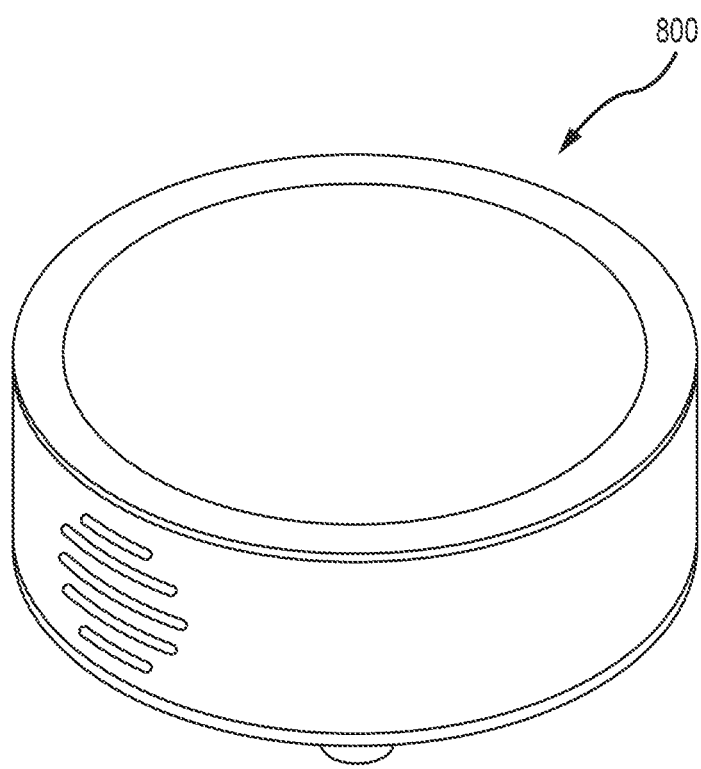
FIG. 21 shows a sensor of a type that may be used with an air ionization unit.

One or more remote sensors 800, shown in FIG. 21, or sensors on or in unit 100, would be in wired and/or wireless communication with control 10. One or more remote sensors 800 may be powered in any suitable manner, such as being battery powered, or may be configured to be plugged into a power outlet. Responsive to information received from one or more remote sensors 800, control electronics 500 may modify operation of unit 100, for example: (1) turning unit 100 on or off, (2) turning fan 5, 6, or 8 on or off, (3) operate unit 100 in an ozone depletion mode when ambient ozone is detected above a target threshold until the ambient ozone level is below a target threshold, (4) increase the duty cycle of unit 100 in order to generate increased ionization and thus increase the rate of particulate removal when remote sensor 800 reports that particulates are above a target threshold.

The one or more sensors 800, and/or sensors that are part of unit 100, which may be used with air ionization unit 100 could measure one or more of: (1) temperature (T), (2) humidity, relative (RH), (3) dew point (Tdp), (4) barometric pressure (mbar, Hg, hPa), (5) oxygen (O2), (6) partial pressure of oxygen (PO2), (7) PM=particulate matter size 1 (e.g., PM 0.3-1.0 µm, 2.-PM 1.0-2.5 µm, 3.-PM 2.5-10 µm), (8) indoor Air Quality (IAQ), (9) carbon monoxide (CO), (10) carbon dioxide (CO2), (11) respiratory irritant, (12) hydrogen sulfide (H2S), (13) nitrogen dioxide (NO2), (14) sulfur dioxide (SO2), (15) chlorine dioxide (CH2O), (16) total volatile organic compounds (tVOC), (17) ozone (O3), (18) infrared (IR), (19) accelerometer (g), (20) GPS, (21) hydrogen (H2), (22) nitrogen oxide, (23) smoke, (24) current to the air ionization unit, (25) air flow through the air ionization unit, (26) gaseous ionization detector, (27) infrared, (28) thermistor, and (29) thermocouple.

The one or more sensors may be used to monitor different zones of an occupied space, either at the same time, at intervals, or at different times for different zones. One or more parameters measured by the one or more sensors may be considered together using any appropriate algorithm. The combination of parameters may then be used to control aspects of the air ionization unit 100.

Control 10 may pulse power convertors in a manner suitable to positively bias power convertors with respect to circuit ground, which results in generation of excess negative ions by ion generator 25.

In one operating mode, control 10 is configured to operate ion generator 25 at an 80% duty cycle (for example, 4 minutes in an ion generation mode, followed by one minute powered down, followed by 4 minutes in an ion generation mode, and so forth). In another operating mode, electronic controls 500 are configured to operate module 100 at a 100% duty cycle (always on). However, any suitable duty cycle may be utilized.

Control 10 may monitor the performance of unit 100 and may signal when a component needs replacing (for example, due to deterioration of ionization components or ozone catalyst 42).

Control 10 may monitor fan 5, 6, and/or 8 speed and current draw, as well as ion generator 25 voltage and current draw. Air ionization unit 100 may be shut down and/or restarted if an anomaly is detected. Additionally, control 10 may monitor status and error conditions, turn an ozone depletion mode on or off, and/or adjust a duty cycle associated with operation of ion generator 25.

Right-side bulkhead (or outgoing air bulkhead) 11 is constructed of stainless steel, steel, aluminum, or any other suitable material. It may be a structural member of ionization unit 100, although it need not be. Bulkhead 11 positions fan assemblies 5 and 6 so that their outflowing air is directed properly. Bulkhead 11 also position the removable air ionization module 16 and its connection to the circuit board assembly 10.

Bulkhead 11 also has a notch 11A in the top center portion of the vertical flange. Notch 11A is intended to locate the plenum 9 so that airflow is directed down into air ionization module 16. Bulkhead 11 may have a hinge on the lower side closest to the air ionization module 16. This hinge permits access door 15 to open and close, providing a convenient way to replace air ionization module 16.

Bulkhead 7 and bulkhead 11 are depicted as two separate pieces; but in an alternate configuration these two bulkheads are combined into one piece, such as a "U-Shaped" piece. This could be done to lower manufacturing cost, to provide additional structural support, and/or to simply have fewer parts.

Intake air filter 13 could be a HEPA (high efficiency particulate) filter, but could also be pleated or fiberglass or any suitable filter. The intake air filter 13 may also have a MERV (Minimum Efficiency Reporting Value) rating suitable for the application and based upon the CADR (Clean Air Delivery Rate). Intake air filter 13 filters air entering ionization unit 100 from the occupied space before the air is ionized and returned to the occupied space.

Access door 14 may be used to access and replace the intake air filter 13. Access door 14 may pivot on a hinge as shown, or slide open and shut, or be removable via hardware. Access door 14 may be comprised of plastic, stainless steel, steel, or one or more other materials as deemed suitable. It may be powder coated (steel or aluminum), anodized (aluminum), passivated (stainless steel), or plated (steel or plastic).

Access door 15 may optionally support air ionization module 16. Door 15 may pivot on a hinge as shown, or slide open and shut, or be removable via hardware. Access door 15 may be made of plastic, stainless steel, mild steel, or other suitable material. It may be powder coated (steel or aluminum), anodized (aluminum), passivated (stainless steel), or plated (steel or plastic).

Figure 5:
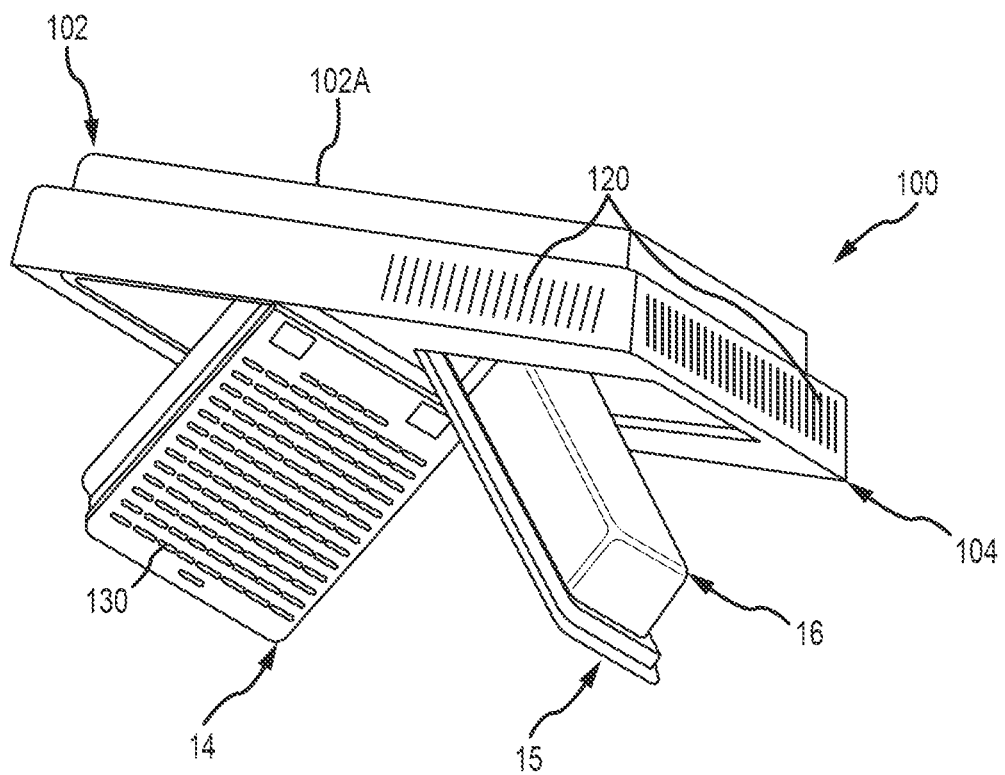
FIG. 5 is a side, perspective view of the air ionization unit of FIG. 1 with the doors open.
Figure 9:
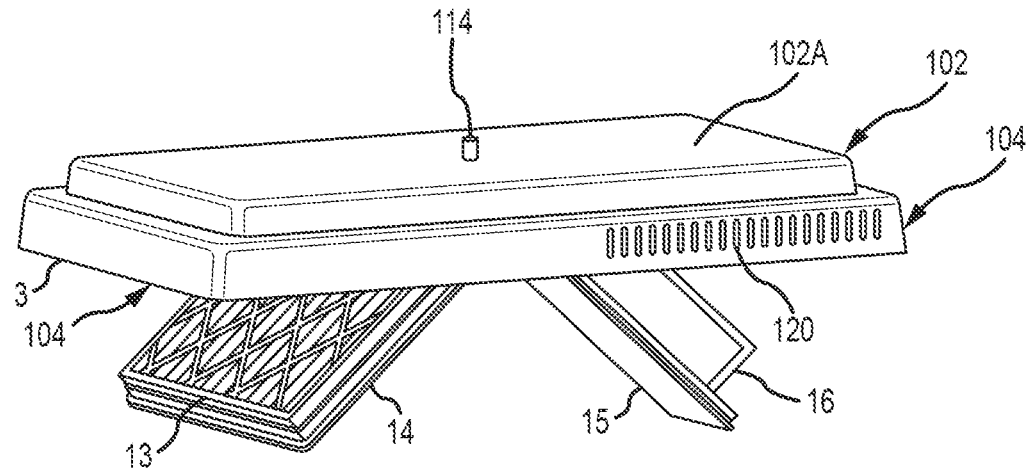
FIG. 9 is a side, perspective view of the air ionization unit of FIG. 8 with its doors open.
Figure 17:
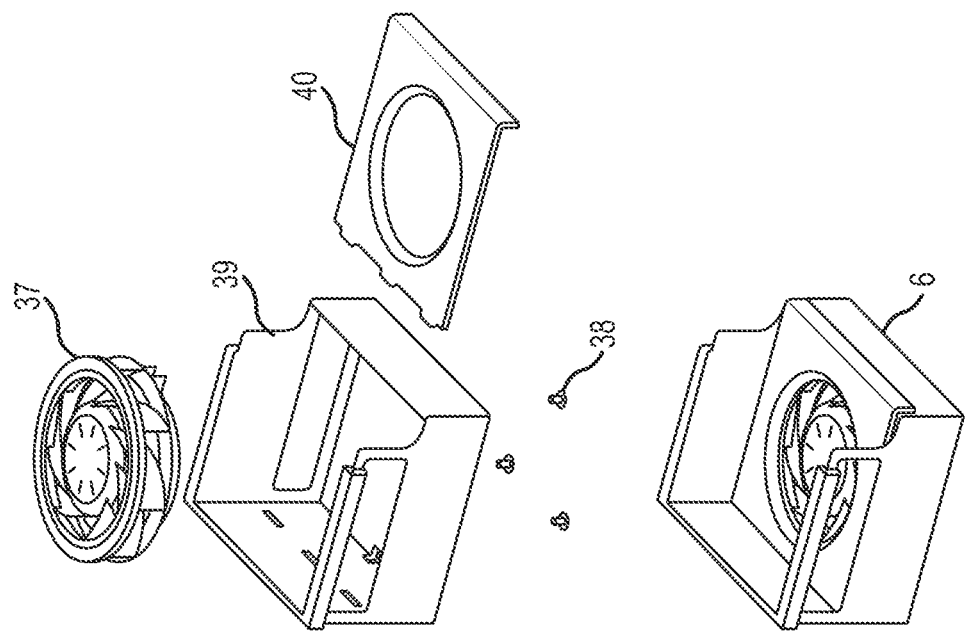
FIG. 17 is an exploded, perspective, side view of a left-side fan assembly.
Figure 16:
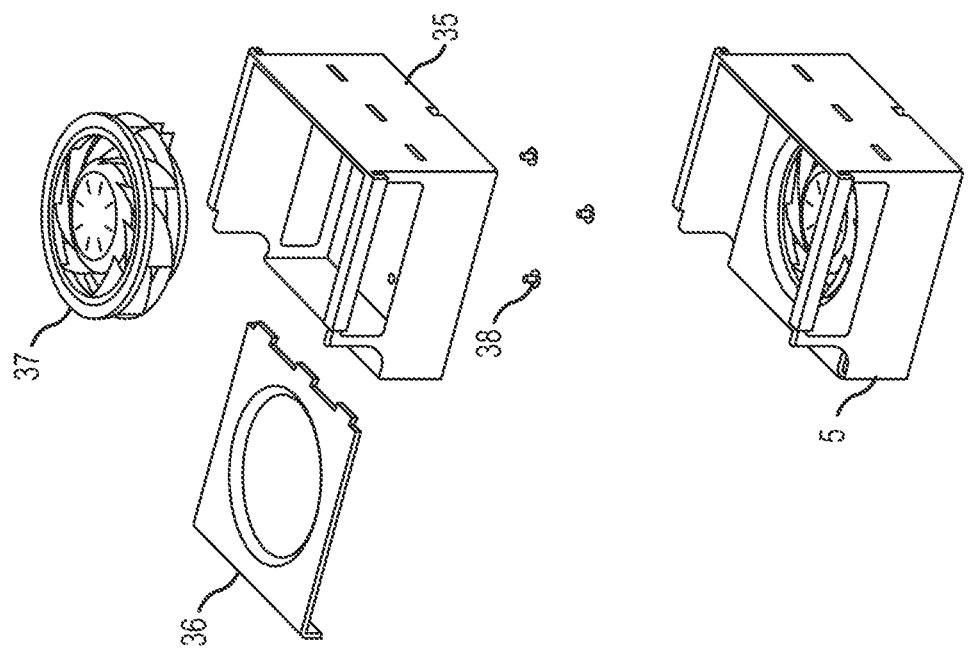
FIG. 16 is an exploded, side, perspective view of a right-side fan assembly.

Access door 14 and access door 15 are shown in the open position (or second position) in FIGS. 5 and 9, which enables access to and replacement of intake air filter 13 and/or ionization module 16. When access door 14 and access door 15 are in this first, closed position, the intake air filter 13 and/or ionization module 16 cannot be accessed.

Air ionization module 16 comprises an ionization tube assembly 25, and an ozone filter containing an ozone mitigating catalyst. It is designed to be easily installed, removed, and replaced, in one example by the use of a docketing connector, such as mechanical guide rails and connectors inside of air ionization unit 100. FIGS. 10-12 show the air ionization module 16, a cross-sectional view of module 16, and an exploded view of module 16.

The top cover 17 of ionization module 16 is made of stainless steel, although any suitable material may be used. The slot 17A top cover 17 permits airflow to enter from the first fan 8 and helps remove the ionized particles from the stainless-steel screen surrounding the glass tube of ionization module 16.

Ozone filters 18A (also called a first filter or first filter unit) and 18B (also called a second filter or second filter unit) as shown are stainless-steel screen assemblies that retain catalyst for ozone removal. The amount of catalyst used is adjusted based on the size and functionality of the ion generator 25, so that ozone generated by air ionization unit 100 is within safe parameters in the air released from air ionization unit 100. In the embodiment shown, ozone filter 18A is positioned on one side of ion generator 25 and ozone filter 18B is positioned on the opposite side. However, the one or more ozone filters may be located at different positions between the ion generator and air outlet. Further, the air ionization unit 100 may have only one ozone filter on one side of the ion generator, or three ozone filters, wherein each filter is on a different side (such as two opposite sides and the top or bottom) of the ion generator, or an ozone filter that partially surrounds or completely surrounds the ion generator 25.

Ionization tube assembly (or ion generator) 25 generates ions for cleaning the air. Structures, known to those in the art, of ion generator 25, are: negative tab 19 for return voltage; rear end cap 20, which is comprised of plastic or other suitable material; negative tab connection point 21; positive tab connection point 22; forward end cap 23, which is comprised of plastic or other suitable material; base plate 24, which is comprised of stainless steel or other suitable material; attachment hardware and positive voltage input 26; base plastic glass holder 27; aluminum internally-threaded rod 28; energy star 29; lock washer 30; screw 31 for securing the energy star; inner perforated aluminum component 32 in a cylinder shape (in the embodiment shown); borosilicate glass tube 33; and outer stainless-steel mesh 34.

Stainless-steel mesh carrier 41 is shown with formed up flanges. Any appropriate material or structure to retain catalyst 42 may be used to form carrier 41.

Catalyst 42 (or ozone-removal catalyst or ozone-dampening catalyst), which is preferably granular, is placed into the cavity of stainless-steel mesh carrier 41. Catalyst 42 can then be shaken or vibrated to ensure full packing of the catalyst in carrier 41. Once catalyst 42 has sufficiently filled carrier 41, the top cover 43 can be spot welded or seam welded, or attached in any suitable fashion, to ensure that the catalyst 42 is retained within the carrier 41.

Catalyst 42 is configured to convert, neutralize, and/or otherwise remove and/or reduce ozone. Catalyst 42 typically comprises manganese dioxide, copper oxide, and/or the like, or combinations thereof. Catalyst 42 may comprise Carulite 200 provided by Cams Corporation (Peru, IL). However, any suitable catalyst configured to neutralize and/or remove ozone from an airstream may be utilized.

Figure 19:
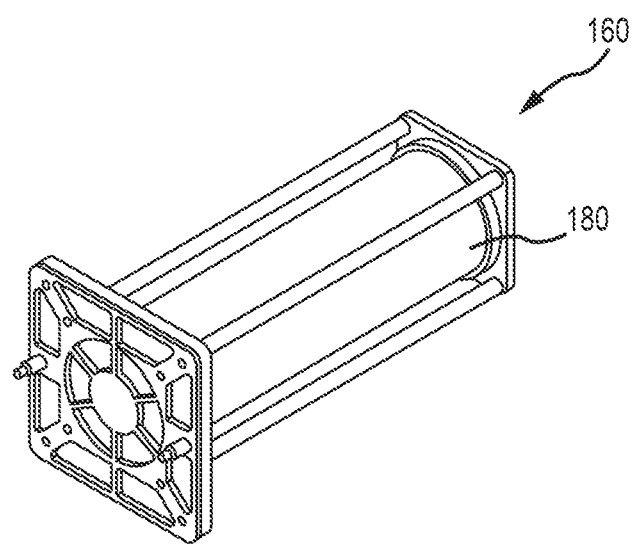
FIG. 19 is a side, perspective view of an alternate air ionization module.
Figure 20:
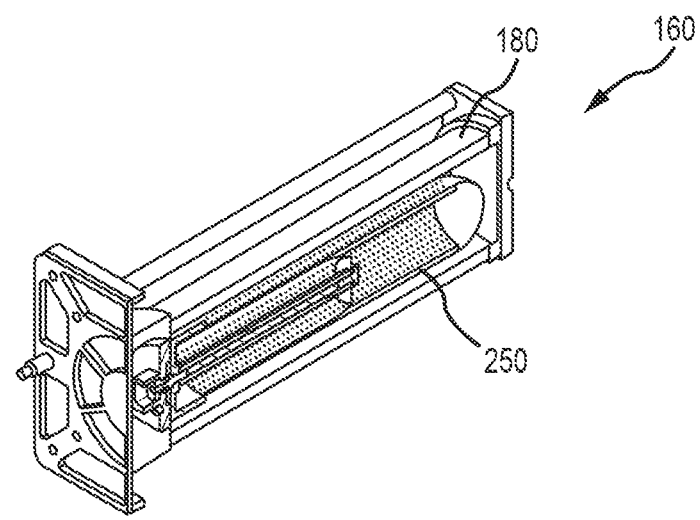
FIG. 20 is a cross-sectional, perspective, side view of the ionization module of FIG. 19.

FIGS. 19-20 show an alternate air ionization module 160 with an ozone filter 180 that surrounds most of the ion generator 250.

Operation

In operation, air from the occupied space enters the air intake 130 and is moved by the first fan assembly 8 into contact with the ion generator 25 that is part of the air ionization module 16. As the air enters the air ionization unit 100 it may be filtered by air intake filter 13 if an air intake filter is used. The air is ionized and pressure from the first fan assembly 8 may move the ionized air outwards through the ozone filters 18A, 18B on either side of the ion generator 25 and back into the occupied space.

Alternatively, the second fan assembly may be utilized to assist in moving air past the one or more ozone filters and into the occupied space, and may also assist in stripping ions from the air after it contacts the ion generator. As shown in this embodiment, the second fan assembly has two fans: a first, left-side fan 5, and a second, right-side fan 6. The second fan assembly, however, if used, could include only one fan or more than two fans. Further, exit air filters may filter the air after it passes through the ozone filters and before the air enters the occupied space.

The air ionization unit may be operated to generate excess ozone and release it into the occupied space when people and/or animals are not present in order to more thoroughly clean the air. This could be done in several ways, such as by: (1) operating the ion generator to produce too much ozone to be sufficiently filtered by the ozone filter(s), (2) moving the ozone filter(s) from a first position in which it filters ozone to a second position in which it filters less ozone than when in the first position, or filters no ozone, or (3) altering the pathway of the air through the air ionization unit so that it bypasses one or more of the ozone filter and is released into the occupied space.

Moving the ozone filter(s) from a first position to a second position can be done manually, such as by a user removing one or more ozone filters. Or, it could be done using a control that operates a device, such as an electric motor, to move the one or more ozone filters upwards, downwards, or in any manner, so the one or more ozone filters filter less ozone than they do when in the first position, and preferably filter no ozone when in the second position.

The air ionization unit may also include an alarm that operates when a dangerous condition is sensed.

The AC transformer can be biased in one way to achieve more negative ions than positive ions, or can be biased to produce more positive ions than negative ions, or can be operated to generate the same number of positive ions and negative ions.

It is desired, but not required, that there is an air conditioning system upstream (AC Unit, de-humidifier, drier, et cetera) that conditions the air before the air is ionized. Once the air is ionized, either negative/positive, control 10 may have the ability to humidify the air downstream of our device. This humidifier (and the upstream air conditioning device) may be linked via the controller 10 so that adjustments can be made in order to optimize the air flow and air cleaning.

In an alternate embodiment shown in FIGS. 19-20, the air ionization unit can be square (e.g., 2×2 feet dimensionally), rectangular (e.g., 2×4 feet dimensionally), or other dimension such that it would fit into a space suitable for the specific application, such as fitting into a space above an acoustic drop ceiling. This embodiment would allow a taller air ionization unit than 65 mm.

Some non-limiting examples of this disclosure are set forth below:

Example 1

An air ionization unit configured to attach to a surface of an occupied space, the air ionization unit comprising:
(a) a top cover;
(b) a lower section attached to the top cover, the lower section configured to be in the occupied space when the top section is attached to the surface;
(c) an air ionization module connectable to a power source and comprising (i) an ion generator, and (ii) an ozone filter that includes an ozone removal catalyst and that at least partially surrounds the ion generator;
(d) a first fan assembly configured to move air into the air ionization module; and
(e) an air discharge configured to permit air to move from the inside of the air ionization unit and into the occupied space after the air has been ionized by the ion generator.

Example 2

The air ionization unit of example 1, wherein the surface is a ceiling.

Example 3

The air ionization unit of example 2, wherein the surface is a ceiling of a vehicle.

Example 4

The air ionization unit of example 1 that further includes an air intake port and an air intake filter juxtaposed the air intake port, wherein the air intake filter is configured to filter air as it enters the air ionization unit.

Example 5

The air ionization unit of example 4, wherein the air intake filter is a pleated air filter.

Example 6

The air ionization unit of example 4, wherein the air intake filter and the air ionization module are in the lower section of the air ionization unit.

Example 7

The air ionization unit of example 1 that further includes a second fan assembly configured to move air through the ozone filter comprising a first, left-side fan, and a second, right-side fan.

Example 8

The air ionization unit of example 7, wherein the second fan assembly comprises a first, left-side fan and second, right-side fan.

Example 9

The air ionization unit of example 1, wherein the ozone filter comprises a first section positioned on a first side of the ion source and a second section positioned on a second side of the ion source.

Example 10

The air ionization unit of example 1, wherein the ozone filter partially surrounds the ion generator.

Example 11

The air ionization unit of any one of examples 1-10, wherein the ion generator is an ion generating tube.

Example 12

The air ionization unit of any one of examples 1-11, wherein the ozone filter comprises an ozone removal catalyst in a container.

Example 13

The air ionization unit of any one of examples 1-12, wherein the ozone removal catalyst is granular.

Example 14

The air ionization unit of example 12 or example 13, wherein the container is comprised of a metal mesh.

Example 15

The air ionization unit of example 14, wherein the metal mesh is comprised of stainless steel.

Example 16

The air ionization unit of any one of examples 4-6 that further comprises a bottom surface including a first door having (a) a closed position in which the air intake filter cannot be accessed, and (b) an open position in which the air intake filter can be accessed and replaced.

Example 17

The air ionization unit of example 16, wherein the air intake filter is attached to the first door.

Example 18

The air ionization unit of any of examples 1-17 that further comprises a second door having (a) a closed position in which the air ionization module cannot be accessed, and (b) an open position in which the air ionization module can be accessed and replaced.

Example 19

The air ionization unit of any of examples 1-18 that further includes a docketing connector that receives and aligns the air ionization module inside of the air ionization unit.

Example 20

The air ionization unit of example 19, wherein the docketing connector comprises one or more rails configured to receive and align the air ionization module.

Example 21

The air ionization unit of any of examples 1-20, wherein the first fan assembly is configured to move air into contact with the ion generator.

Example 22

The air ionization unit of any of examples 1-21, wherein the ion generator is configured to generate more negative ions than positive ions.

Example 23

The air ionization unit of any of examples 1-22, wherein the ion generator is configured to generate at least 60% negative ions.

Example 24

The air ionization unit of any of examples 1-23 that further comprises a control system that measures an ion count in the air and adjusts the power to the ion generator based at least in part on the measured ion count in the air.

Example 25

The air ionization unit of example 24, wherein the control system also measures at least one of an ozone level, an air temperature, a particulate level, a carbon monoxide level, and a humidity.

Example 26

The air ionization unit of example 24 or example 25, wherein the ion generator comprises an ion dispenser configured to receive electrical current responsive to operation of the control system.

Example 27

The air ionization unit of any of examples 1-26, wherein the ion generator further comprises:
(a) an inner electrode electrically coupled to the ion generator, the inner electrode comprising a perforated aluminum sheet;
(b) a glass tube disposed at least partially around the inner electrode; and
(c) an outer electrode disposed at least partially around the glass tube, wherein the outer electrode comprises a tubular stainless-steel mesh screen.

Example 28

The air ionization unit of any of examples 1-27, wherein the ozone filter further comprises:
(a) an inner stainless-steel mesh screen forming a first tube;
(b) an outer stainless-steel mesh screen forming a second tube; and wherein the ozone catalyst is disposed between the first tube and the second tube.

Example 29

The air ionization unit of example 28, wherein the ozone filter further comprises a pair of end caps coupling the first tube and the second tube.

Example 30

The air ionization unit of any one of examples 24-26 that further comprises a sensor in communication with the control system, wherein the sensor measures at least one of an ion level, an ozone level, an air temperature, a particulate level, a carbon monoxide level, and a humidity, and wherein the sensor communicates the at least one measurement to the control system.

Example 31

The air ionization unit of example 30, wherein the sensor communicates wirelessly with the control system.

Example 32

The air ionization unit of any one of examples 1-31 that further comprises an air filter disposed between the air ionization unit and the air discharge.

Example 33

The air ionization unit of any one of examples 1-32, wherein the air ionization module is configured to be removed from the air ionization unit and replaced.

Example 34

The air ionization unit of example 30 or example 31 that includes a plurality of sensors that communicate with the control system.

Example 35

The air ionization unit of any of examples 30-31 or 34, wherein the control system adjusts the power to the ion generator based on one or more of the measured ion level, ozone level, carbon monoxide level, air temperature, particulate level, and humidity.

Example 36

The air ionization unit of any of examples 30-31, or 34-35, wherein the control system adjusts the speed of the first fan assembly based on one or more of the measured ion level, ozone level, carbon monoxide level, air temperature, particulate level, and humidity.

Example 37

The air ionization unit of any of examples 30-31, or 34-36, wherein the control system adjusts the speed of the second fan assembly based on one or more of the measured ion level, ozone level, carbon monoxide level, air temperature, particulate level, and humidity.

Example 38

The air ionization unit of any of examples 1-37, wherein the ozone filter has a first position in which it at least partially surrounds the ion generator, and a second position in which it either surrounds less of the ion generator than it does when in the first position or does not surround any of the ion generator.

Example 39

The air ionization unit of any of examples 1-38, wherein the first fan unit operates on DC power.

Example 40

The air ionization unit of any of examples 1-39, wherein the first fan assembly generates between 8.1 and 39.9 CFM.

Example 41

The air ionization unit of example 7 or example 8, wherein each fan in the second fan assembly generates between 8.1 and 39.9 CFM.

Example 42

The air ionization unit of any of examples 1-41 that further includes a high voltage transformer.

Example 43

The air ionization unit of example 42, wherein the high voltage transformer is connected to the control system.

Example 44

The air ionization unit of any of examples 24-26, 30-31, or 34-37, wherein the control system is configured to receive video from a video camera.

Example 45

The air ionization unit of any of examples 24-26, 30-31, 34-37, or 44, wherein the control system is configured to communicate with a central controller remote from the air ionization unit and remote from the occupied space.

Example 46

The air ionization unit of example 45, wherein the central controller is configured to adjust one or more of: the amount of ionization by the ion generator, the amount of negative ions versus positive ions generated by the ion generator, the speed of the first fan assembly, and the speed of the second fan assembly.

Example 47

The air ionization unit of example 18, wherein the air ionization module is connected to the second door.

Example 48

The air ionization unit of any one of examples 1-21 or 24-47, wherein the ion generator is configured to generate more positive ions than negative ions.

Example 49

The air ionization unit of any one of examples 1-48, wherein the ozone filter has a first position in which it filters ozone from the air, and a second position in which it filters less ozone from the air than it did when in its first position.

Example 50

The air ionization unit of example 49 in which the ozone filter does not filter the air when in its second position.

Example 51

The air ionization unit of example 49 or example 50 in which the ozone filter is between the air ionization unit and the air discharge when in its first position, and is not between the air ionization unit and the discharge when in its second position.

Example 52

The air ionization unit of any one of examples 1-51, wherein the ozone filter comprises a first filter unit on a first side of the air ionization module and a second filter unit on a second side of the air ionization unit.

Example 53

The air ionization unit of example 52, wherein the first side of the air ionization module is opposite the second side of the air ionization module.

Example 54

The air ionization unit of either example 52 or example 53, wherein the first filter unit is moveable between a first position in which it filters ozone and a second position in which it filters less ozone than when in the first position.

Example 55

The air ionization unit of any one of examples 52-54, wherein the second filter unit is moveable between a first position in which it filters ozone and a second position in which it filters less ozone than when in the first position.

Example 56

The air ionization unit of any one of examples 1-55, wherein the air discharge comprises a first discharge juxtaposed a first side of the air ionization unit and a second discharge juxtaposed a second side of the air ionization unit.

Example 57

The air ionization unit of example 54, wherein the first filter unit does not filter ozone when in the second position.

Example 58

The air ionization unit of example 55, wherein the second filter unit does not filter ozone when in the second position.

Example 59

The air ionization unit of any of examples 1-58, wherein the air discharge comprises one or more louvers or vents.

Example 60

The air ionization unit of any of examples 1-59 that further includes one or more air filters at the air discharge.

Example 61

The air ionization unit of example 8, wherein the first, left-side fan is configured to move air on a first side of an ion generator, and the second, right-side fan is configured to move air on a side of the ion generator that is opposite the first side.

Example 62

The air ionization unit of any of examples 7-8 or 61, wherein the second fan assembly is positioned above the air ionization module.

Example 63

The air ionization unit of example 54, wherein the first filter unit does not filter ozone when it is in its second position.

Example 64

The air ionization unit of example 55, wherein the second filter unit does not filter ozone when it is in its second position.

Example 65

The air ionization unit of any of examples 1-15 that includes a single door having a first, closed position in which the air ionization module cannot be accessed, and a second, open position in which the air ionization module can be accessed and replaced.

Example 66

The air ionization unit of example 65 in which an intake air filter may be accessed and replaced when the single door is in its second, open position.

Example 67

The air ionization unit of any one of examples 1-13 that further includes a lower surface and a single door in the lower surface, wherein the single door has a first, closed position in which the air ionization module cannot be accessed, and a second, open position, in which the air ionization module can be accessed and replaced.

Example 68

The air ionization unit of example 67, wherein an air intake filter can be accessed and replaced when the single door is in its second, open position.

Example 69

The air ionization unit of example 67, wherein the air ionization module is attached to the single door.

Example 70

The air ionization unit of example 68, wherein the air intake filter is attached to the single door.

Example 71

The air ionization unit of example 67 or example 68, wherein the air ionization module is attached to the single door.

Some further non-limiting examples of this disclosure follows:

Example 1

An air ionization method that utilizes an air ionization unit and that comprises the steps of:
- (a) operating one or more ion generators to generate ions into the air;
- (b) moving air into the air ionization unit and into contact with the one or more ion generators;
- (c) moving at least some of the air with ions past an ozone filter that includes an ozone removal catalyst for removing at least some ozone from the air; and
- (d) moving the at least some of the air out of the air ionization unit and into an occupied space.

Example 2

The air ionization method of example 1, wherein the one or more ion generators generate more negative ions than positive ions.

Example 3

The air ionization method of example 1 or example 2 that further includes the step of filtering the at least some the air before moving it into contact with the one or more ion generators.

Example 4

The air ionization method of example 3, wherein the step of filtering is performed by moving the at least some of the air through an air intake filter that is positioned inside of the air ionization unit.

Example 5

The air ionization method of any one of examples 1-4, wherein the ion generator is disposed at least partially within the ozone removal filter is positioned between the one or more ion generators and the occupied space.

Example 6

The air ionization method of example 1, wherein the step of moving the at least some of the air is performed by operating a first fan assembly that is positioned inside of the air ionization unit.

Example 7

The air ionization method of example 6, wherein the first fan assembly generates 8.1 to 39.9 CFM.

Example 8

The air ionization method of example 1 that further includes the step of measuring an ion amount in the air and operating the one or more ion generators to produce fewer or more ions based at least in part on the measured ion amount.

Example 9

The air ionization method of example 1 that further includes the step of measuring at least one of the following of the air: an ozone level, an air temperature, a particulate level, a carbon monoxide level, and a humidity.

Example 10

The method of example 9 that further includes the step of operating the one or more ion generators to produce fewer or more ions based at least in part on the measured amount in the air of at least one of: the ozone level, an air temperature, the particulate level, the carbon monoxide level, and the humidity.

Example 11

The air ionization method of any one of examples 1-10, wherein the step of moving the at least some of the air with ions past an ozone filter comprises moving air into a space between the one or more ion generators and the ozone filter.

Example 12

The air ionization method of any one of examples 1-11, wherein the one or more ion generators and ozone filter are constructed as an air ionization module, and that further comprises the steps of (a) removing the air ionization module from the air ionization unit, and (b) replacing the air ionization module with another air ionization module.

Example 13

The air ionization method of any one of examples 4-12, wherein the air ionization unit comprises a first door that has (a) a closed position, and (b) an open position in which the air intake filter can be accessed and removed.

Example 14

The air ionization method of any one of examples 1-13, wherein the air ionization comprises a second door that has (a) a closed position, and (b) an open position in which the ozone filter, ion generator, and/or the air ionization module can be accessed and removed.

Example 15

The air ionization method of any one of examples 4-14 that further comprises the step of measuring air flow through the air intake filter.

Example 16

The air ionization method of any one of examples 4-15 that further includes the step of determining when the air intake filter should be changed and alerting a user that the air filter.

Example 17

The air ionization method of any one of examples 1-16 that further includes the step of determining when the ozone filter should be replaced.

Example 18

The air ionization method of any one of examples 1-17 that further includes the step of moving the ozone filter from a first position at which it removes at least some ozone from the air, to a second position at which it removes less ozone than when in the first position, or no ozone, from the air.

Example 19

The air ionization method of example 18, wherein the ozone filter is moved to the second position when no humans are in the occupied space.

Example 20

The air ionization method of any one of examples 1-19 that further includes one or more sensors for measuring one or more of an ozone level, an air temperature, a particulate level, a carbon monoxide level, and a humidity.

Example 21

The air ionization method of any one of examples 1-20, wherein the air ionization unit further includes a control system in communication with the ion generator and that controls the operation of the ion generator.

Example 22

The air ionization method of any one of examples 1-21, wherein the control system wirelessly controls the operation of the ion generator.

Example 23

The air ionization method of any one of examples 21 or 22, wherein the control system is inside of the air ionization unit.

Example 24

The air ionization method of any one of examples 21 or 22, wherein the control system is remote to the air ionization unit.

Example 25

The air ionization method of example 21, wherein the control system is in communication with the one or more sensors and the control system controls the ion generator based on information received from the one or more sensors.

Example 26

The air ionization method of example 25, wherein the control system wirelessly communicates with the one or more sensors.

Example 27

The air ionization method of example 25, wherein the control system is inside of the air ionization unit.

Example 28

The air ionization method of example 25, wherein the control system is remote to the air ionization unit.

Example 29

The air ionization method of any one of examples 1-28, wherein the air ionization unit comprises a first fan assembly that includes a first, left-side fan, a second, right-side fan.

Example 30

The air ionization method of example 29, wherein the first fan moves air past a first side of the air ionization module, the second fan moves air past the ion generator, and the third fan moves air past a second side of the air ionization module.

Example 31

The air ionization method of any one of examples 1-30 that further comprises the steps of opening a first door on a bottom surface of the air ionization unit, accessing and replacing the air intake filter, and closing the first door.

Example 32

The air ionization method of any one of examples 1-31 that further comprises the steps of opening a second door on a bottom surface of the air ionization unit, accessing and replacing the air ionization module, and closing the second door.

Example 33

The air ionization method of any one of examples 1-32, wherein the one or more ion generators are configured to generate at least 60% negative ions.

Example 34

The air ionization method of any one of examples 1-33 that further includes the step of measuring at least one of an ozone level, an air temperature, a particulate level, a carbon monoxide level, and a humidity.

Example 35

The air ionization method of example 34, wherein a sensor in communication with the control system measures the at least one of an ozone level, an air temperature, a particulate level, a carbon monoxide level, and a humidity, and that further includes the step of the sensor communicating the at least one measurement to the control system.

Example 36

The air ionization method of example 35, wherein the sensor communicates wirelessly with the control system.

Example 37

The air ionization method of example 35 or example 36 that includes a plurality of sensors that communicate with the control system.

Example 38

The air ionization method of any one of examples 21-28 or 35-37 that further includes the step of the control system adjusting the speed of the first fan assembly based on one or more of the measured ozone level, carbon monoxide level, air temperature, particulate level, and humidity.

Example 39

The air ionization method of any one of examples 21-28 or 35-38 that further includes the step of the control system adjusting the speed of the second fan assembly based on one or more of the measured ozone level, carbon monoxide level, air temperature, particulate level, and humidity.

Example 40

The air ionization method of any one of examples 21-28 or 35-39 that further includes the step of the control system receiving video from a video camera.

Example 41

The air ionization method of any one of examples 21-28 or 35-40 that further includes the step of the control system communicating with a central controller remote from the air ionization unit and remote from the occupied space.

Example 42

The air ionization method of example 41, wherein the central controller is configured to adjust one or more of the amount of ionization by the ion generator, the amount of negative ions versus positive ions generated by the ion generator, the speed of the first fan assembly, and the speed of the second fan assembly.

Example 43

The air ionization method of any one of examples 21-28 or 35-42 that further includes the step of the control system adjusting the amount of ionization by the ion generator and/or the amount of negative versus positive ions generated by the ion generator.

The present invention has been described above with reference to a number of exemplary embodiments and examples. The particular embodiments shown and described herein are illustrative of the exemplary embodiments, and are not intended to limit the scope of the invention. Changes and modifications may be made to the embodiments described herein without departing from the scope of the present invention. These and other changes or modifications are intended to be included within the scope of the claimed invention and the legal equivalents thereof

What is claimed is:

1. An air ionization unit that is configured to attached to a surface of an occupied space, the air ionization unit comprising:
(a) a top section;
(b) a lower section attached to the top section, the lower section configured to be in the occupied space when the top section is attached to the surface;
(c) an air ionization module connectable to a power source and comprising (i) an ion generator, and (ii) an ozone filter that includes an ozone removal catalyst, wherein the ozone filter has a first position in which it is installed in the ionization unit and filters ozone from the air, and a second position in which it is installed in the ionization unit and filters less ozone from the air than it does when in its first position in the ionization unit;
(d) a first fan assembly configured to move air into contact with the air ionization module; and
(e) an air discharge configured to permit air to move from the inside of the air ionization unit and into the occupied space after the air has been ionized by the ion generator.

2. The air ionization unit of claim 1 that further includes an air intake port and an air intake filter juxtaposed the air intake port, wherein the air intake filter is configured to filter air as it enters the air ionization unit.

3. The air ionization unit of claim 1 that further includes a second fan assembly configured to move air through the ozone filter.

4. The air ionization unit of claim 3 wherein the second fan assembly comprises a first, left-side fan and second, right-side fan.

5. The air ionization unit claim 3, wherein the second fan assembly is positioned above the air ionization module.

6. The air ionization unit of claim 1, wherein the ozone filter comprises a first filter unit positioned on a first side of the ion generator and a second filter unit positioned on a second side of the ion generator.

7. The air ionization unit of claim 1, wherein the ozone filter comprises the ozone removal catalyst inside of a container.

8. The air ionization unit of claim 7, wherein the container is comprised of a metal mesh.

9. The air ionization unit of claim 1 that further comprises a bottom surface including a first door having (a) a closed position in which the air intake filter cannot be accessed, and (b) an open position in which the air intake filter can be accessed and replaced.

10. The air ionization unit of claim 9, wherein the air intake filter is attached to the first door.

11. The air ionization unit of claim 1 that further comprises a second door having (a) a closed position in which the air ionization module cannot be accessed, and (b) an open position in which the air ionization module can be accessed and replaced.

12. The air ionization unit of claim 11, wherein the air ionization module is connected to the second door.

13. The air ionization unit of claim 1 that further comprises a control system that measures an ion count in the air and adjusts the power to the ion generator based at least in part on the measured ion count in the air.

14. The air ionization unit of claim 13 that further comprises a sensor in communication with the control system, wherein the sensor measures at least one of an ozone level, an air temperature, a particulate level, a carbon monoxide level, and a humidity, and wherein the sensor communicates the at least one measurement to the control system.

15. The air ionization unit of claim 14, wherein the control system adjusts the power to the ion generator based on one or more of measured ozone level, ion level, carbon monoxide level, air temperature, particulate level, and humidity.

16. The air ionization unit of claim 14, wherein the control system adjusts the speed of the first fan assembly based on one or more of the measured ion level, ozone level, carbon monoxide level, air temperature, particulate level, and humidity.

17. The air ionization unit of claim 14, wherein the control system adjusts the speed of the second fan assembly based on one or more of the measured ozone level, carbon monoxide level, air temperature, particulate level, and humidity.

18. The air ionization unit of claim 1, in which the ozone filter does not filter the air when in its second position.

19. The air ionization unit of claim 1, wherein the ozone filter comprises a first filter unit on a first side of the air ionization module and a second filter unit on a second side of the air ionization unit.

20. The air ionization unit of claim 1 that further includes a lower surface and a single door in the lower surface, wherein the single door has a first, closed position in which the air ionization module cannot be accessed, and a second, open position, in which the air ionization module can be accessed and replaced.

21. The air ionization unit of claim 20, wherein an air intake filter can be accessed and replaced when the single door is in its second, open position.

22. The air ionization unit of claim 20, wherein the air ionization module is attached to the single door.

23. The air ionization unit of claim 21, wherein the air intake filter is attached to the single door.

24. The air ionization unit of claim 22, wherein the air ionization module is attached to the single door.

* * * * *